United States Patent [19]

Wakeman et al.

[11] Patent Number: 4,571,996
[45] Date of Patent: Feb. 25, 1986

[54] AIR FLOW SENSOR

[75] Inventors: Russell J. Wakeman, Newport News; Danny O. Wright, Grafton; William A. Peterson, Jr., Williamsburg, all of Va.

[73] Assignee: Allied Corporation, Morris Township, Morris County, N.J.

[21] Appl. No.: 639,560

[22] Filed: Aug. 10, 1984

[51] Int. Cl.[4] .............................................. G01F 5/00
[52] U.S. Cl. ................................................... 73/202
[58] Field of Search ......................... 73/202, 204, 118

[56] References Cited

U.S. PATENT DOCUMENTS

| Re. 26,410 | 6/1968 | Chanaud . | |
|---|---|---|---|
| 3,251,225 | 5/1966 | Luft . | |
| 3,443,434 | 5/1969 | Baker et al. | 73/202 |
| 3,559,482 | 2/1971 | Baker et al. | 73/204 |
| 3,616,693 | 11/1971 | Burgess . | |
| 3,618,383 | 11/1969 | Molben | 73/203 |
| 3,688,576 | 9/1972 | Obermaier et al. | 73/202 |
| 3,702,566 | 11/1972 | Obermaier et al. | 73/202 X |
| 3,719,080 | 3/1973 | Burgess . | |
| 4,056,977 | 11/1977 | Gau | 73/272 R |
| 4,089,215 | 5/1978 | Chapin | 73/116 |
| 4,142,407 | 3/1979 | Kuroiwa et al. | 73/118 |
| 4,215,565 | 8/1980 | Zanker | 73/30 |
| 4,282,751 | 8/1981 | Brown et al. | 73/202 |
| 4,304,128 | 12/1981 | Hafner et al. | 73/204 |
| 4,304,129 | 12/1981 | Kawai et al. | 73/204 |
| 4,381,668 | 5/1983 | Sato et al. | 73/204 |
| 4,395,907 | 8/1983 | Morita et al. | 73/202 |
| 4,418,568 | 12/1983 | Surman | 73/202 |
| 4,459,847 | 7/1984 | Kita | 73/861.22 X |
| 4,478,075 | 10/1984 | Oyama et al. | 73/118 |

Primary Examiner—Herbert Goldstein
Attorney, Agent, or Firm—Russel C. Wells; Markell Seitzman

[57] ABSTRACT

An air flow sensor (10) as may be used to measure input air to an internal combustion engine has an aerodynamically designed impact tube (16) for diverting bypass air to a pair of sensors (28, 30). Downstream from the impact tube (16) is a venturi section providing exhaust means for the bypass air. The exhaust path configuration for the bypass air shields the sensors (28, 30) from a reverse pressure wave which can result from an engine backfire. The impact tube (16) operates to integrate the air velocity over a full radius of the air flow body (14).

10 Claims, 11 Drawing Figures

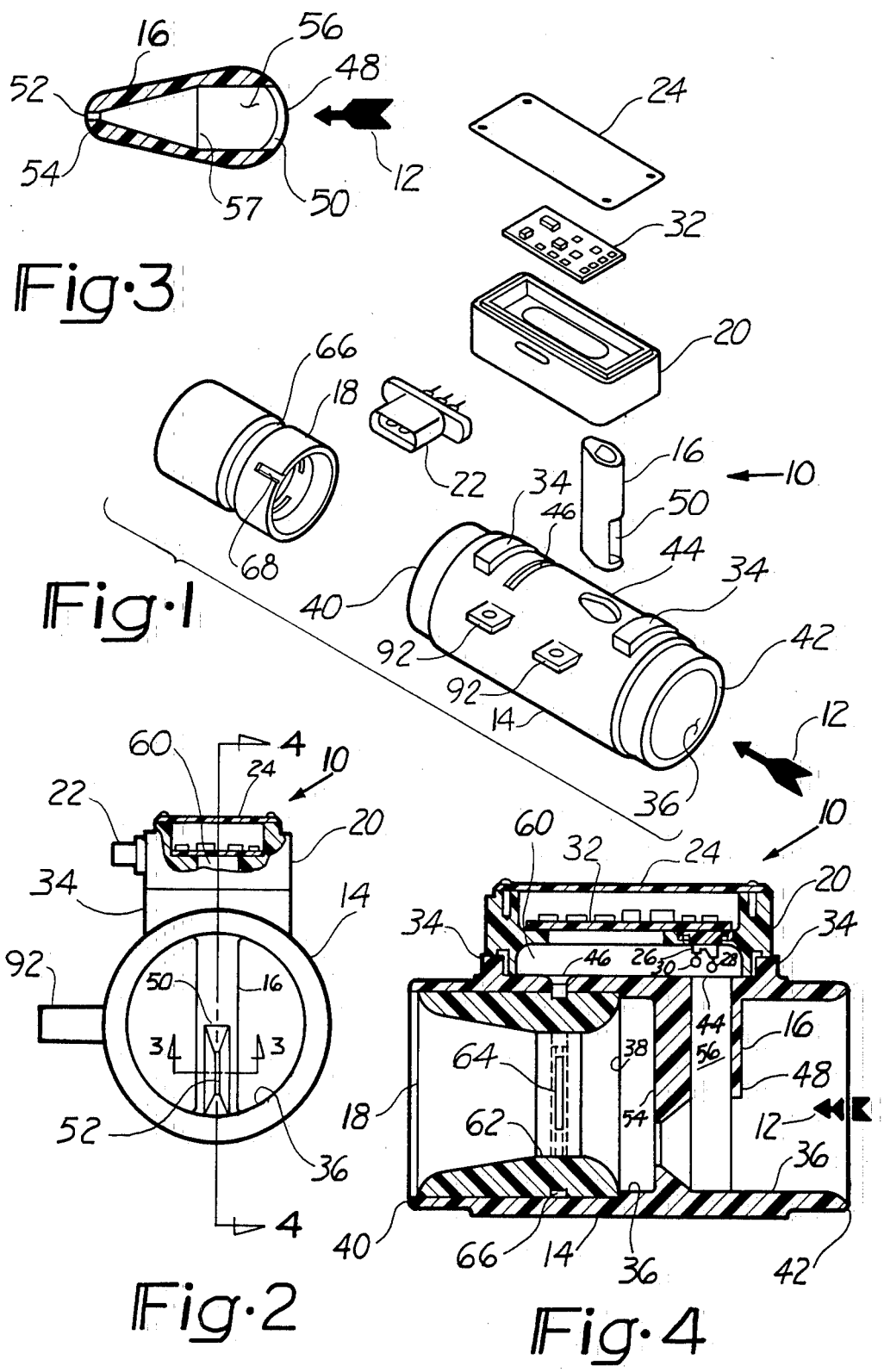

AIR FLOW SENSOR

This invention relates to air flow sensors in general and more particularly to a sensor using proportional air flow in a bypass chamber to determine the rate of air flow and by circuit means mass air flow.

BACKGROUND OF THE INVENTION

In fuel management systems many calculations are made to determine the amount of fuel which should be injected in the engine to maintain a predetermined air/fuel ratio. Ideally, a direct reading of the amount of air flowing into an engine and the mass of the air is desired to use in calculations for fuel consumption, ignition, etc.

Measurement of the flow of liquids such as air has been tried by many different types of meters. An air meter with the fewest or no moving parts can best withstand the environments wherein an internal combustion engine must operate.

U.S. Pat. No. 4,381,668 issued on May 3, 1983 to Sato et al and entitled "Gas Flow Measuring Apparatus" teaches a flow meter having no moving parts having a bypass section to sample flow. The section samples flow along the wall in a low pressure area and exhausts the flow from the bypass area in the center of a venturi; both locations are low pressure locations.

U.S. Pat. No. 4,304,128 issued on Dec. 8, 1981 to Hafner et al and entitled "Apparatus for Measuring the Mass of a flowing Medium," teaches the use of a temperature dependent resistor placed in a bridge circuit and the complete electronics package mounted on the meter. Air flow is sampled in a cylinder located along the axis and not across the total flow. Since the resistor is in the mainstream of the air through the meter, any reverse flow is measured giving rise to inaccurate measurements.

U.S. Pat. No. 4,304,129 issued on Dec. 8, 1981 to Kawai et al and entitled "Gas Flow Measuring Apparatus" uses an electric heater placed between two measuring resistances and all three are located in the main flow. Reverse flow of the gas is measured giving rise to inaccurate measurements.

In each of the above patents there is no immunity to reverse or back flow, therefore, the measurements are not accurate. In none is the flow across the whole meter measured, only flow along a surface or along an axially centered circular area.

SUMMARY OF THE INVENTION

An air flow sensor adaptable for use in the air intake system of an automotive internal combustion engine, measures the rate of air flow and calculates the mass of the air entering the engine. Air flow sensors as described herein are used to provide the correct mass air measurements for electronic fuel injection calculations. The air flow sensor has a cylindrical air flow body with a straight flow section and a venturi flow section. Interposed the ends of the straight flow section is an impact tube extending across the full diameter of the section. The output of the tube directs bypass air into a pneumatic chamber having substantially unidirectional flow characteristics with a pair of sensing elements at the interface of the tube and the diode chamber.

The impact tube having an air foil section cross section, has a pair of opposed slots, one on the nose edge and one on the trailing edge. The nose slot is longer and wider than the trailing edge slot and extends from the longitudinal axis of the straight section to the wall of the section. Thus, the slot is open to the fastest and the slowest air flow velocities in the section. The trailing edge slot being smaller is centrally located opposite the first slot and permits some of the air entering the nose slot to pass through. The slots are positioned at the greatest distance from the interface of the diode chamber and the impact tube.

The exhaust port from the diode chamber is positioned at the middle of the smallest diameter of the venturi section of the meter. As the main air flow passes this section, a pressure differential is created between the opening of the first slot in the impact tube and the exhaust port causing an amount of bypass air to flow through the diode chamber.

The positioning of the impact tube normal to the axis of the flow meter causes the bypass air to turn at right angles to its normal flow. This diversion of bypass air causes most of the dirt particles in the air to continue in the normal air stream direction and not in the bypass air stream in the impact tube.

The positioning of the sensor elements at the interface of the diode chamber and the impact tube is the area for the greatest sensitivity of the sensor element to the amount of air flow in the impact tube. One boundary surface of the diode chamber is the electronic circuit module for converting the bypass air flow into data signals.

It is by the positioning and cooperation of the several elements of the air flow sensor that the data signals generated accurately indicate the mass of the air flowing into the engine.

These and other objects and advantages will become apparent in the following detailed description and drawings.

IN THE DRAWINGS

FIG. 1 is an exploded view of the air flow sensor.

FIG. 2 is an end view.

FIG. 3 is a sectional view of the impact tube taken along line 3—3 of FIG. 2.

FIG. 4 is a sectional view taken along line 4—4 of FIG. 2.

DETAILED DESCRIPTION

Figure 5:
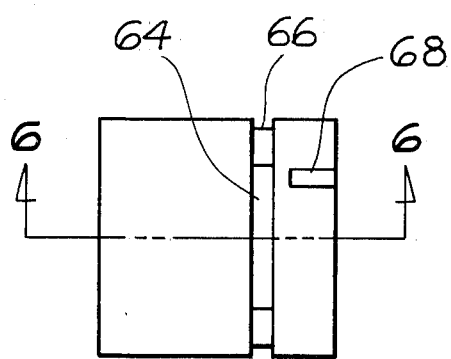
FIG. 5 is a plan view of the venturi insert member of the air flow sensor.

Referring to FIG. 1, is an exploded view of the air flow sensor 10 of the preferred embodiment. Most of the major components of the air flow sensor 10 are fabricated or molded from a plastic material. The air flow sensor 10 of this embodiment is typically found in the air intake system for internal combustion engines such as are used in motor vehicles. Therefore, the extremes of the environment must be considered in the selection of a material. In all the Figures the direction of air flow is indicated by an arrow 12.

The air flow sensor 10 comprises an air flow body 14, an impact tube 16, a venturi insert member 18, and an air bypass housing 20. The air bypass housing 20 has an electrical connector 22 mounted thereon, a cover member 24, a sensing element housing 26 having a first sensor 28 and second sensor 30 or collectively called sensing elements, and an electronic circuit module 32.

The air flow body 14, in the preferred embodiment, is substantially a cylindrical hollow tubular member having one or more ribs 34 formed on the outer surface. The inside surface 36 of the air flow body 14 has at least two different diameters at the junction of which a shoulder 38 is formed. The shoulder 38 is interposed the ends 40, 42 of the air flow body 14 and in the preferred embodiment is substantially at its midpoint. The shoulder 38 forms a location for the venturi insert member 18 which is positioned adjacent the first end 40 having the largest diameter. Positioned between the shoulder 38 and the other end 42 in the section of the air flow body 14 having the smaller diameter, is an input port 44 centered along an aligning diameter and extending through the wall of the air flow body 14.

Located between the shoulder 38 and the first end 40 and centered along a diameter which is parallel to the aligning diameter of the input port 44, is a slot or exhaust port 46 extending through the wall of the air flow body 14. The cross-sectional area of the exhaust port 46 is larger than the cross-sectional area of the input port 44.

Figure 7:
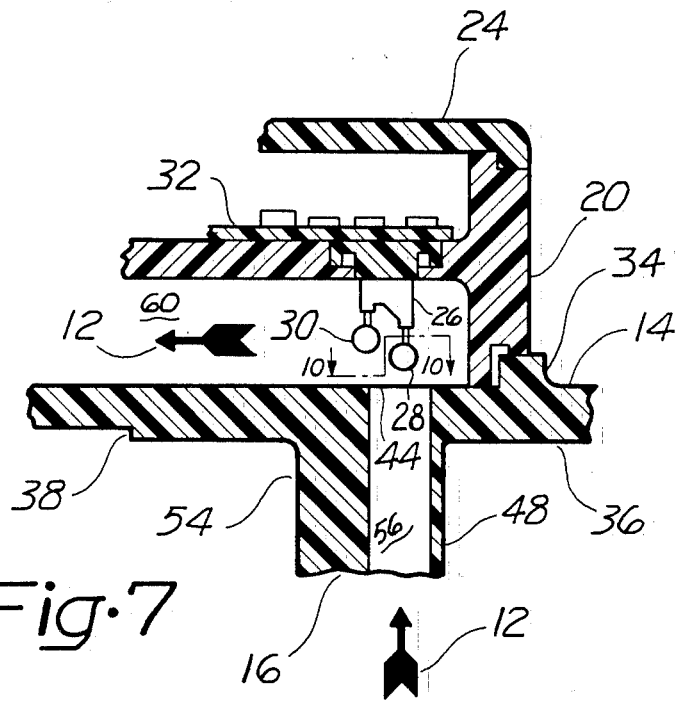
FIG. 7 is an enlarged view of the sensor impact tube interface.

The impact tube 16 is a member having a cross section normal to its axis in the shape of an air foil. The blunt or nose edge 48 of the air foil is positioned to receive the air flow. The impact tube 16 in the preferred embodiment, is molded into the air flow body 14 as illustrated in FIGS. 2, 4 and 7 and not a separate piece as shown in FIG. 1.

Viewing the cross section of the impact tube 16 in FIG. 3 a first and second slot 50, 52 are formed at one end of the foil. The first slot 50, at the nose edge 48 of the air foil cross section, is wider than the second slot 52 at the trailing edge 54. It is imperative that the first slot 50 length is equal to the radius of the inside diameter of the air flow body 14 and that it begin on the axis of air flow body and extend to its inner wall 36.

The second slot 52 is centered between the extremes of the first slot 50 and its length is less than the first slot 50. Referring to FIG. 3, which is a cross-sectional view of the impact tube 16 taken in a direction toward the sensor elements 28, 30, the relationship of the impact tube passageway 56 to the first and second slots 50, 52 is shown. The impact tube passageway 56 terminates at the inner wall 36 of the air flow body 14. From the trailing edge 52 of the impact tube passageway 56 the walls, all four, within the impact tube 16 extending to the second slot 52 are tapered. The reason for the tapered sides or walls is to gather and transmit dust and dirt in the air flow that enters the first slot 50 and exhaust it out of the second slot 52 and prevent the collected dust and dirt from entering the diode chamber of the air bypass housing 20. Thus, the purpose of the second slot 52 is to dispose or exhaust the dust and dirt particles that are centrifuged out of the sample air by the 90° turn the sampled air makes entering the impact tube passageway 56.

The venturi insert member 18 is a separate member in the preferred embodiment having a length that is approximately equal to the axial distance from the first end 40 of the air flow body 14 to the shoulder 38. The venturi insert member 18 is inserted into the air flow body 14 and into abutment with the shoulder 38.

Figure 9:
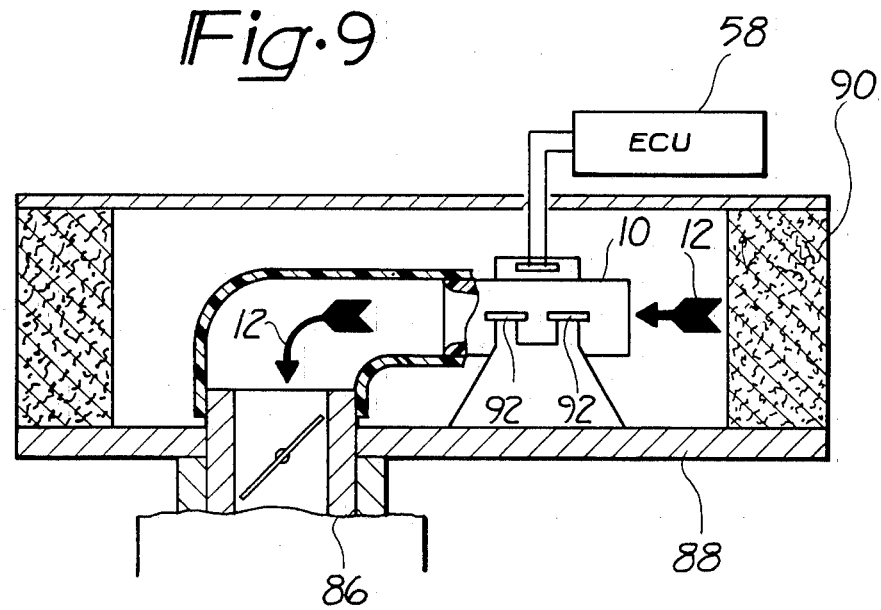
FIG. 9 is a schematic view partially in section illustrating the air flow sensor mounted to measure the air intake to an internal combustion engine.

The air bypass housing 20 serves many functions. First, it is a housing to mount the electrical connector 22 which is used to connect the air flow sensor 10 to an electronic control unit or ECU 58 as illustrated in FIG. 9.

The first function of the air bypass housing 20 is to support and locate the air flow sensing elements 28, 30 which are illustrated as two cylindrical elements in FIG. 7.

The second function of the air bypass housing 20 is to locate and support the electronic circuit module 32. As will hereinafter be shown, the module 32 may be fabricated by thick film techniques although any electronic construction may be used. In the preferred embodiment, the air bypass housing 20 is cast aluminum to provide a heat sink for the electronic circuit module 32.

The third function of the air bypass housing 20 is to provide an air bypass flow chamber 60 between the input port 44 and the exhaust port 46. This chamber 60 is formed by inner walls of the air bypass housing 20, the outer surface of the air flow body member 14 and the electronic circuit module 32. The volume of the chamber 60 must be large enough so as not to provide any restriction to the flow of bypass air.

The fourth function of the air bypass housing 20 is to have the air bypass flow chamber 60 act as a pneumatic diode in that its construction and its location on the air flow body 14 will minimize any reverse air flow such as an engine backfire from flowing from the exhaust port 46 to the input port 44. By so functioning, the information generated by the electronic circuit module 32 will be less affected by reverse air flow.

The air bypass housing cover member 24 is used to seal the interior from adverse effects of the environment. In addition, the air bypass housing 20 is sealed on the outer surface of the air flow body 14.

Figure 6:
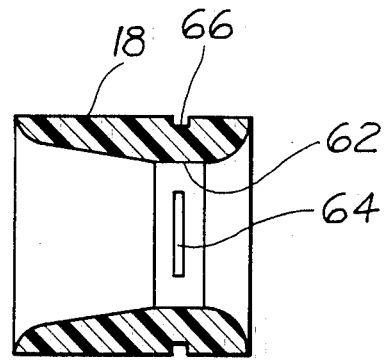
FIG. 6 is a sectional view taken along line 6—6 of FIG. 5.

The venturi insert member 18, as previously stated, is a cylidrical member having an axially extending venturi cross section as illustrated in FIG. 6. Circumferentially located at the middle of the minor diameter 62 of the venturi are a plurality of equally and angularly spaced venturi slots 64 extending through the wall of the insert into a ring slot 66 on the outside surface. When the venturi insert member 18 is inserted in the air flow body 10, the ring slot 66 is axially positioned by the shoulder 38 to be aligned with the exhaust port 46.

A key and keyway 68 between the venturi insert member 18 and the air flow body 14 is used to align the venturi insert member 18 in such a manner that none of the venturi slots 64 will be aligned with the exhaust port 46 in the air flow body 14. This is to prevent a direct opening to any pressure wave that is generated as a result of an engine backfire from going into the bypass flow chamber 60. In this manner, the bypass air flows out of the chamber 60 through the exhaust port 46, around the ring slot 66 and exits through the venturi slots 64 and on into the engine.

The air foil cross section of the impact tube 16 reduces air flow interference. The first slot 50 along the nose edge 48 of the air foil receives the air flow and extends from the axis of the air flow body 14 to the inside surface 36 of the air flow body 14. The first slot 50 is positioned as far from the input port 44 as possible to shield the sensing elements 28, 30 from dirt particles that are in the air flow. It is known that the air flow velocity along the axis is the highest and at the wall it is the lowest. Therefore, to determine the complete air flow, the first slot 50 extends for a full radius of the air flow tube and functions to integrate the velocity.

The distance between the input port 44 and the exhaust port 46 satisfies the conflicting requirements of being as short as possible while at the same time being long enough to avoid any reaction due to the impact tube 16 on the air flowing through the venturi section.

As is well known, a lower pressure is created by the venturi section thereby a pressure differential is formed between the first slot 50 in the impact tube 16 and the venturi slots 64 in the venturi insert member 18. The magnitude of the pressure differential is proportional to the amount of air flowing through the air flow sensor 10.

FIG. 7 illustrates the location of the first or flow sensor 28 and the second or ambient sensor 30 with respect to the input port 44. The flow sensor 28 is positioned closest to the input port 44 and is typically centered on the longitudinal axis of the impact tube passageway 56. The location of the highest velocity of bypass air is on the longitudinal axis of the pasageway, therefore, a step response is generated by the action of the air flow flowing across the sensors 28, 30. In addition, the dust and dirt which may still be in the area has a minimum effect due to the velocity. The ambient sensor 30 is generally positioned downstream and rearward of the flow sensor 28.

Figure 10A:
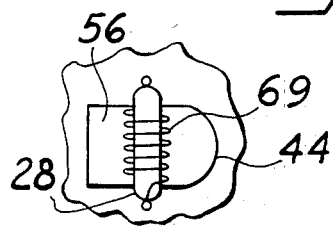
FIGS. 10a and 10b are sectional views taken along line 10—10 of FIG. 7 showing the relationship of sensor to the input port.
Figure 10B:
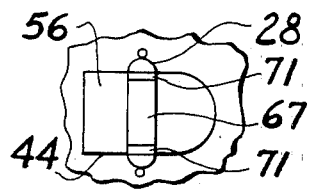

As shown in FIGS. 10a and 10b, the flow sensor 28 and the ambient sensor 30 have a finite length which is not greater than the arcuate length of the input port 44 to cover the flow out of the impact tube passageway 56. If the sensors were longer, their ability to accurately respond to the effects of the air flow are materially diminished.

The flow sensor 28 and the ambient sensor 30 are fabricated as temperature sensitive resistors such as nickel or platinum 67, FIG. 10b, by the techniques of sputtering on a substrate, winding wire around a substrate, or supporting wire in free space. Sputtering is accomplished by using thin film circuit techniques and the length of the sensor are terminated by a pair of bands 71. When the sensors 28, 30 are wirewound 69, FIG. 10a, around a substrate or supported in free space, bare wire is used and each turn is spaced from the adjacent turns. In any case, the ends of the sensors 28, 30 are supported and the wire leads from the sensors are attached to the electronic circuit module 32, and the sensors are coated with a protective substance such as glass, by means of sputtering, or dipped in an epoxy resin.

The flow sensor 28 is heated, by the application of current therethrough to a temperature that is controlled to a specified increment above the temperature of the ambient sensor 30. This heating is controlled by means of electronic circuit means 70 including a bridge circuit 68 as illustrated in FIG. 8.

Figure 8:
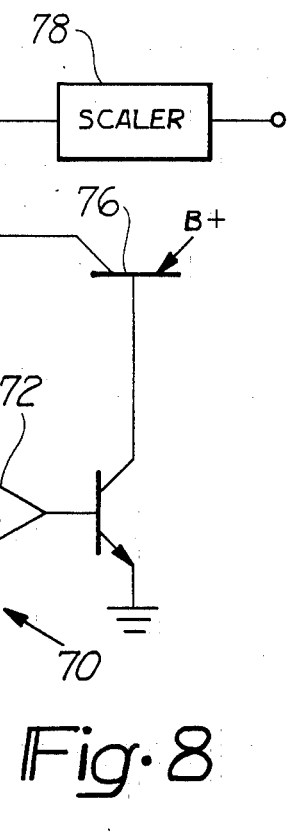
FIG. 8 is a block diagram schematic of the circuit connecting the air flow sensing elements.

The electronic circuit means 70 of FIG. 8 functions as a constant temperature hot sensor anemometer via a feedback signal from a differential error integrating amplifier 72.

The error signal is used to heat the flow sensor element 28 component to maintain balance in the Wheatstone bridge 68 circuit. The resistance ratio of the series resistor 74 to the flow sensor 28 determines the amount of temperature elevation for the flow senor 28. As air passes over the flow sensor 28, it cools the sensor 28 thereby creating an error signal by unbalancing the bridge circuit 68, which signal is supplied to the differential error integrating amplifier 72. The output of the amplifier 72 increases the current heating the flow sensor 28 through the pass transistor 76 to reduce the error signal to zero thereby balancing the bridge circuit 68. By this means the voltage, or current, at the bridge circuit 68 becomes an effective measurement of air flow at the flow sensor 28. This voltage is scaled by the output stage or scaler 78 to provide a current signal proportional to the mass air flow. In essence, the output is a current source. By having the output a current source, this maintains a high noise and ground potential immunity for the low level signal from the bridge circuit 68.

In order for the sensors 28, 30 to function properly at any incoming air temperature, the second leg of the bridge circuit 68 must be an unheated ambient sensor 30 identical to the flow sensor 28. This identical match of both the ambient sensor 30 and the flow sensor 28 provides excellent transient temperature compensation as well as steady-state signals. The resistor 80 in series with the ambient sensor 30 is added to modify the temperature coeffeicient (TCR) to equal that of the flow sensor 28 inasmuch as the effective TCR of the flow sensor 28 decreases when it is heated up.

To avoid self heating of ambient sensor 30, the bridge circuit voltage is scaled down by a 10:1 ratio in one amplifier 82 and then restored by scaling up by a 1:10 ratio in a second amplifier 84. These two scaling amplifiers 82, 84 appear before and after the ambient sensor leg of the bridge circuit 68. These circuits, by their construction permit adjustment of sensor gain and offset as well as the system damping factor for overshoot and stability control.

FIG. 9 illustrates an example of connecting the air flow sensor 10 to the throttle body 86 of an internal combustion engine. In this Figure the air flow sensor 10 is mounted in an air cleaner 88 and receives air as shown by the arrow 12 from the air cleaner filter 90. Support for the air flow sensor 10 may be by means of one or more mounting tabs 92 as illustrated in FIGS. 1 and 2. Another alternative may be to connect the air flow sensor 10 to an air filter 90 by means of a tube so that the air filter 90, air flow sensor 10 and throttle body 86 are effectively connected in line.

There has thus been shown and described an air flow sensor 10 utilizing bypass air flowing from an impact tube 16, through a bypass flow chamber 60 to a venturi section. The arrangement between the exhaust port 46 and the venturi slots 64 minimize or obstruct reverse air flow from effecting the output of the sensors 28, 30. The velocity of the air flowing through the air flow sensor 10 is integrated across a full radius of the inside diameter of the air flow body 14.

What is claimed:

1. An air flow sensor for measuring the rate of air flow, the sensor comprising:
an air flow body having a substantially cylindrical hollow tubular cross section having at least two different internal diameters to exhaust air at a first end and receive air at the other end, said body having a shoulder formed at the junction of said diameters, an input port intermediate said other end and said shoulder and an exhaust port intermediate said shoulder and said first end and axially aligned with said input port;

a cylindrical venturi insert member inserted into said first end of said air flow body and into abutment with said shoulder, said venturi insert member having a ring slot on the outer surface thereof with at least two spaced slots therein extending through the minor diameter of the venturi section for communicating with said exhaust port;

a tubular impact tube extending along a diameter from the inner wall of said air flow body through said input port to the outer surface of said air flow body, said impact tube having a first and second oppositely disposed slots for receiving air flow into said first slot and exhausting air flow from said second slot, said impact tube having an axially extending passageway for diverting air flow from said first slot to a passageway along the axis of said tubular cross section;

an air bypass housing mounted on said air flow body and enclosing said input and exhaust ports providing an air flow bypass chamber therebetween for receiving diverted air from said impact tube and exhausting the diverted air through said exhaust port;

first and second sensors in said air bypass housing and aligned along the axis of said impact tube, said sensor elements located to receive the maximum velocity of the bypass air flowing from said impact tube; and electronic circuit means electrically connected to said sensor elements and operable to generate electrical signals proportional to the rate of air flow through said air flow sensor.

2. In the air flow sensor according to claim 1 wherein said slots in said ring slot on said venturi insert member are positioned for obstructing reverse air flow to said exhaust port from said first end of said air flow body.

3. In the air flow sensor according to claim 1 wherein said sensor elements are two cylindrical resistive elements wherein said first sensor is responsive to air flow and is positioned upstream from said second sensor and adjacent to said input port.

4. In the air flow sensor according to claim 3 wherein said first and second sensor elements are wire wound elements having an axial length not greater than the arcuate length of said input port on said air flow body.

5. In the air flow sensor according to claim 3 wherein said first and second sensor elements comprise temperature sensitive material sputtered on a non-conductive cylinder in such a pattern having an axial length not greater than the arcuate length of said input port on said air flow body.

6. In the air flow sensor according to claim 1 wherein said first slot in said impact tube extends from the axis of said air flow body to the inner surface of said air flow body diametrically opposite said input port.

7. In the air flow sensor according to claim 1 wherein said impact tube has an air foil cross section.

8. In the air flow sensor according to claim 1 wherein said electronic circuit means comprises a bridge circuit having said first and second sensors electrically connected in opposite circuit legs thereof, an amplifier means adapted to maintain said first sensor at a temperature greater than the temperature of said second sensor, and an error signal means responsive to changes in said temperature of said first sensor to generate an output signal indicating the rate of air flow through said air flow sensor.

9. In the air flow sensor according to claim 8 additionally including one scaling amplifier electrically connected in the second sensor circuit of said bridge circuit to scale down the magnitude of the electric current flowing therethrough and a second scaling amplifier electrically connected to the output of said second sensor circuit to scale up and restore the magnitude of the electric current flowing as a result of the current through said second sensor.

10. In the air flow sensor according to claim 8 wherein said output signal is a current source having a high noise and ground potential immunity capability.

* * * * *